United States Patent [19]

Von Holdt

[11] Patent Number: 4,648,834
[45] Date of Patent: Mar. 10, 1987

[54] MOLD FOR MANUFACTURING FLANGED OBJECTS WITHOUT SIDE ACTION

[76] Inventor: John W. Von Holdt, 7430 North Croname Rd., Niles, Ill. 60648

[21] Appl. No.: 742,330

[22] Filed: Jun. 7, 1985

[51] Int. Cl.[4] .................. B29C 45/40; B29C 45/44
[52] U.S. Cl. ........................... 425/556; 264/334; 425/436 R; 425/422; 425/DIG. 58
[58] Field of Search ........... 425/236, 282, 286, 537, 425/554, 556, 436 R, 436 RM, 438, 422, 442, DIG. 5, DIG. 58, DIG. 218; 264/334

[56] References Cited

U.S. PATENT DOCUMENTS

| | | | |
|---|---|---|---|
| 3,572,424 | 3/1971 | Byrne | 425/556 |
| 3,905,740 | 9/1975 | Lovejoy | 425/556 |
| 4,125,246 | 11/1978 | Von Holdt | 425/556 |

Primary Examiner—Jay H. Woo
Assistant Examiner—Timothy W. Heitbrink
Attorney, Agent, or Firm—Charles F. Pigott, Jr.

[57] ABSTRACT

An outer mold half and a mold core define as part of the mold cavity an annular chamber portion for receiving molding compound to form an outwardly projecting, relatively thick annular section in the molded object. Stripper means push newly formed molded objects out of intimate contact with the mold core. The diameter of a portion of the mold core across which the annular section is pushed by the stripper means is less than the diameter of the mold core portion against which the annular section is formed. Accordingly, the cooling, freshly molded annular section can shrink inwardly and be drawn out of the annular chamber portion, for removal from the mold without the need of side action.

20 Claims, 5 Drawing Figures

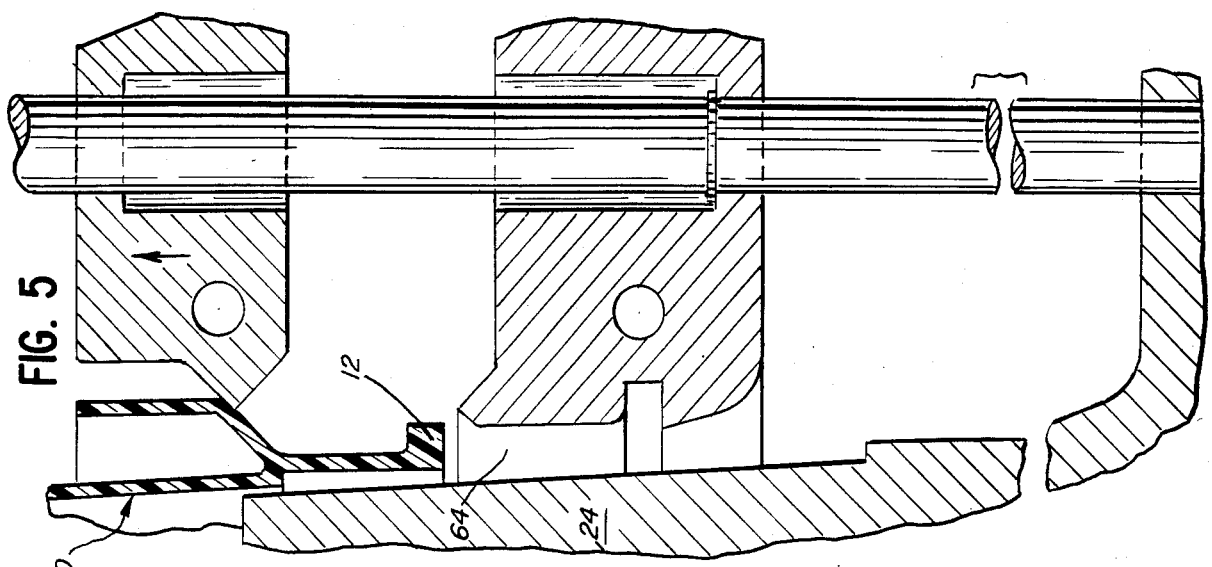
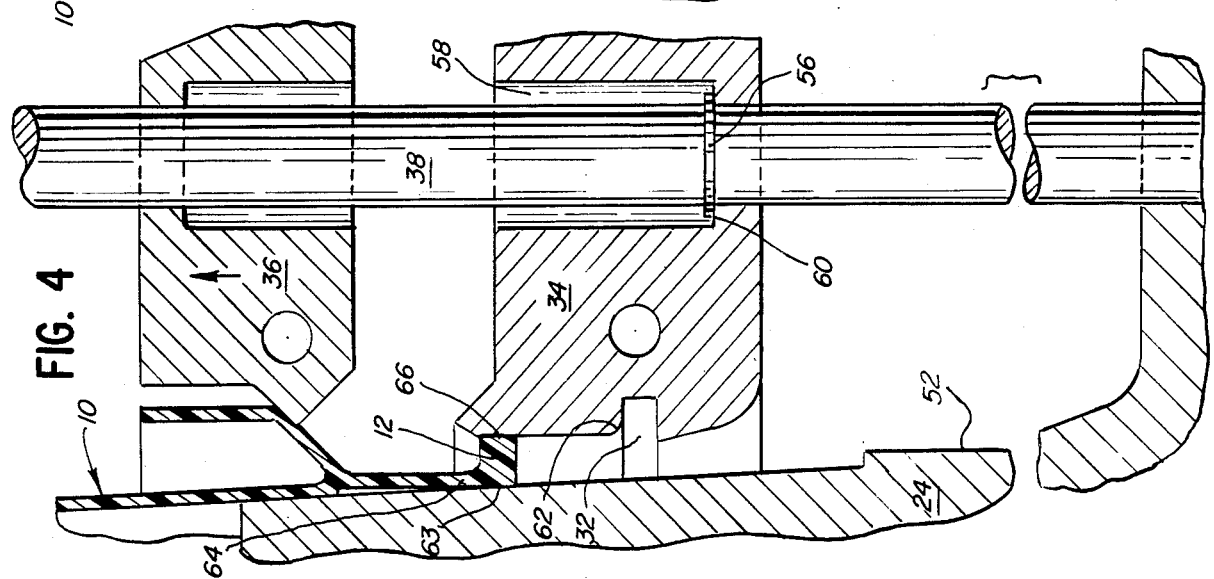
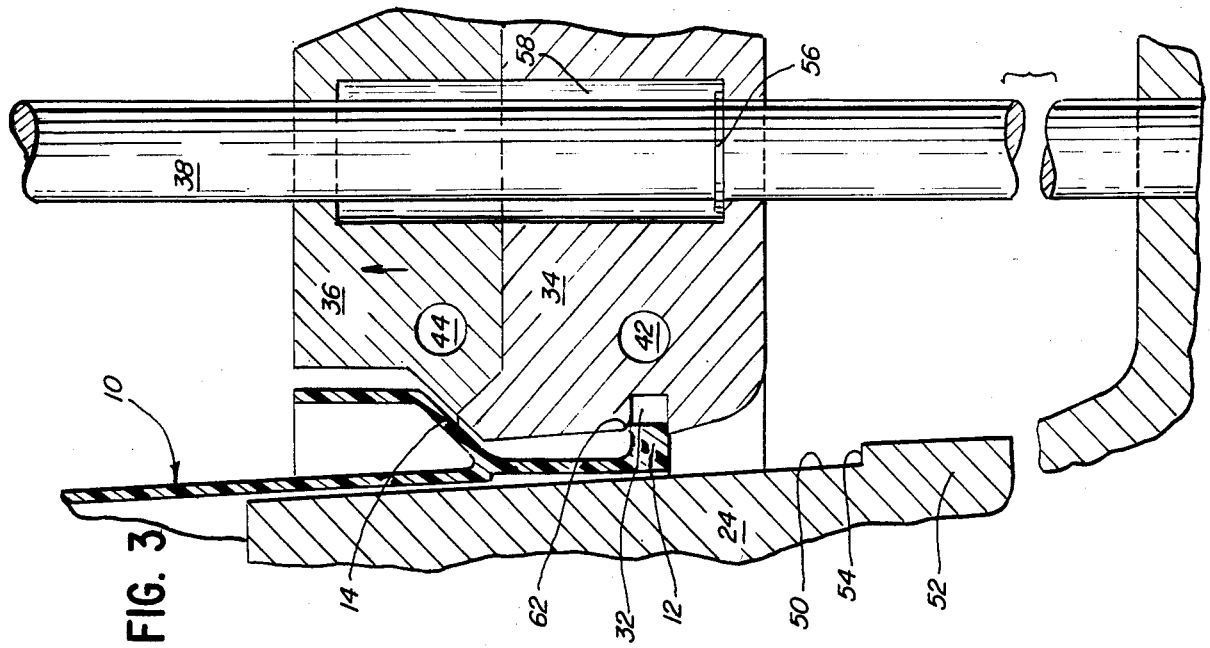

MOLD FOR MANUFACTURING FLANGED OBJECTS WITHOUT SIDE ACTION

BACKGROUND OF THE INVENTION

Molded buckets often have an outwardly projecting flange of increased wall thickness extending around their rims. Additionally, molded buckets may have a second flange, spaced from the rim, which may be used to provide hoop strength to the open end of the bucket, and also may be the site on which a bail handle may be attached by one of various means available to the industry.

To mold such a bucket, it has been typically necessary to provide "side action", i.e., a sideways moving portion in the outer mold half which can participate in the defining of the portion of the mold cavity that forms the rim, and then can move sideways out of the way to permit the newly molded bucket to be removed from the mold core. Such side action is particularly needed when the mold cavity forms a second flange in the bucket which is spaced from the rim. In this circumstance, the side action is necessary to free the outwardly projecting rim of the bucket for removal. Traditionally, such a bucket could not be molded in the absence of side action.

By this invention, apparatus is provided for molding buckets or any other objects which have on outwardly projecting annular section while eliminating the need for side action. This has significant advantages. First, the side action adds to the expense of the mold in a significant way. Secondly, the side action may be the first part of the mold to wear out. Thus elimination of the side action mechanism provides a longer lasting mold which, of course, results in a significant decrease in the per unit cost of articles molded therein.

DESCRIPTION OF THE INVENTION

This invention relates to a mold having an outer mold half and a mold core which define between them a mold cavity. The mold half and mold core are movable between a molding position and an open position to permit removal of objects molded therein. Sprue means (a sprue aperture) is providing for allowing filling of the mold cavity with molding compound while in the closed position.

In accordance with this invention the mold defines, as part of the mold cavity, an annular chamber portion for receiving molding compound to form an outwardly projecting, relatively thick annular section in the molded object. Typically, when the molded object is a bucket, the relatively thick annular section may be an outwardly projecting annular bucket rim.

Stripper means are provided for pushing newly formed molded objects out of intimate contact with the mold core. The stripper means is typically a ring which engages outwardly projecting portions of the molded object with the stripper means being driveable to push the molded object away from the mold core, thus breaking the natural adhesion that takes place between the molded object and the mold core during the molding process.

The diameter of a portion of the mold core across which the annular section of a molded object is pushed by the stripper means is less than the diameter of the mold core portion against which the annular section is formed. The two mold core portions may be connected to each other by a step, if desired, or by a tapered portion.

As a result of this, the cooling, freshly molded, relatively thick annular section naturally engages in some shrinkage. Since the annular section is relatively thick, its shrinkage is relatively increased. Thus, the shrinkage of the relatively thick, cooling, freshly molded annular section can cause it to be drawn out of the annular chamber portion to at least an extent that permits removal of the molded item from the mold without the need of side action.

The shrinkage of the thick annular section may not be enough to cause it to completely clear its engagement with the annular chamber portion which it was formed. Accordingly, the upper edge of the annular chamber portion may define an arc in cross section, so that the stripper ring, acting typically on another molded flange in the bucket spaced from the relatively thick, annular section, can force the annular section out of its engagement with the annular chamber portion as the bucket is moved off of the mold core. The relatively thick annular section can then spring back a predetermined distance, to form the finished bucket of predetermined dimensions.

The annular chamber portion is movable with newly formed molded objects as they are moved out of intimate contact with the mold core, to pass across the portion of the mold core which permits the outwardly projecting, relatively thick annular section to shrink inwardly as it cools, thus drawing it out of the annular chamber portion.

It is generally preferred for the stripper means to comprise a first stripper ring which defines the annular chamber portion, and a second stripper ring which defines one side of a second, outwardly projecting portion of the mold cavity spaced from the relatively thick annular section, which annular section may be the rim of a bucket.

Pin means in this circumstance are provided for guiding the movement of the first and second stripper rings in a direction generally parallel to the movement of the mold core and mold cavity. Means are also provided for driving the second stripper ring to move newly formed molded objects out of intimate contact with the mold core by pushing the outwardly projecting members formed in molded objects by the second outwardly projecting portion of the mold cavity.

The first stripper ring, on the other hand, is typically freely slidable on the pin means or other means that guide their motion for a limited distance which is less than the length of movement of the second stripper ring. Thus the first stripper ring moves with newly formed molded objects until the thick annular section of the molded objects disengages from the annular chamber portion of the first stripper ring. This may happen as the first stripper ring moves to the end of its limited distance, but the second stripper ring continues to move, driving the thick annular section away from the annular chamber portion. As stated above, shrinkage in this circumstance causes the thick annular section to be removed part way from the annular chamber portion. Then, the forceful pushing action of the second stripper ring causes the molded object and the second stripper ring to move away from the first stripper ring, thus forcing the relatively thick annular section out of its engagement with the annular chamber portion.

It is also preferable for a portion of the mold core which is of less diameter than the mold core portion against which the annular section is formed to have at least a section which is parallel to a portion of the stripper means to define an annular passage of predetermined width that the thick, annular section must pass through. As a result of this, the radial thickness of the thick, annular section is precisely controlled, since the hot plastic material can be shaped by passage through this annular passage. Thus, the concentricity, spring-back distance, and the like in the thick, annular section can be precisely controlled.

The term "spring-back distance" refers to the fact that if the thick, annular section is forcefully popped out of the annular chamber portion after it has engaged in some shrinkage to spontaneously come part way out, the thick, annular section will spring back a little bit after it is completely disengaged from the mold. The amount of this spring-back must be precisely controlled, and is a function of the radial thickness of the thick, annular section. By the above described means, the radial thickness of the thick, annular section can be precisely controlled, with the result that its spring-back distance after removal from the mold will also be precisely controlled. This provides buckets that are uniform in dimension so that they can be easily closed with a molded lid of predetermined dimensions.

Other factors pertaining to the control of the amount of spring-back include the dimensions of the annular chamber, the mold cycle time, the type of molding compound, the mold temperature and material temperature, and control of water temperatures in the cooling water lines of the first and second stripper rings.

THE DESCRIPTION OF DRAWINGS

In the drawings, FIG. 1 is a perspective view of a bucket made in a mold of this invention.

FIGS. 3, 4 and 5 are fragmentary longitudinal sectional views of a portion of the mold of FIG. 2 shown in different operating positions.

DESCRIPTION OF SPECIFIC EMBODIMENT

Figure 1:
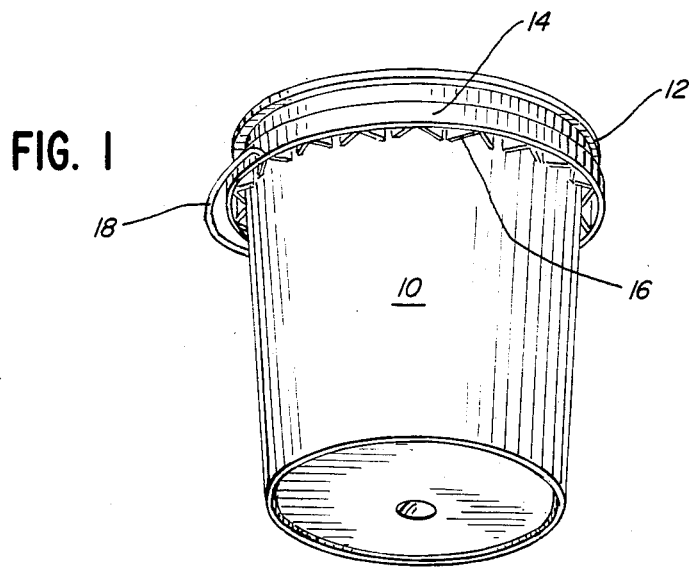

Referring to the drawings, FIG. 1 discloses a molded plastic bucket 10 of the type which may be manufactured making use of the mold of this invention. As shown, bucket 10 defines an outwardly projecting, relatively thick, annular rim 12. Additionally, a second flange 14, spaced from rim 12, is also provided on bucket 10, with ribbing 16 holding the flange in position. Handle 18 is also provided.

In accordance with this invention, outwardly projecting rim 12 may be molded on bucket 10 despite the presence of outwardly projecting flange 14, and without the need for side action.

Figure 2:
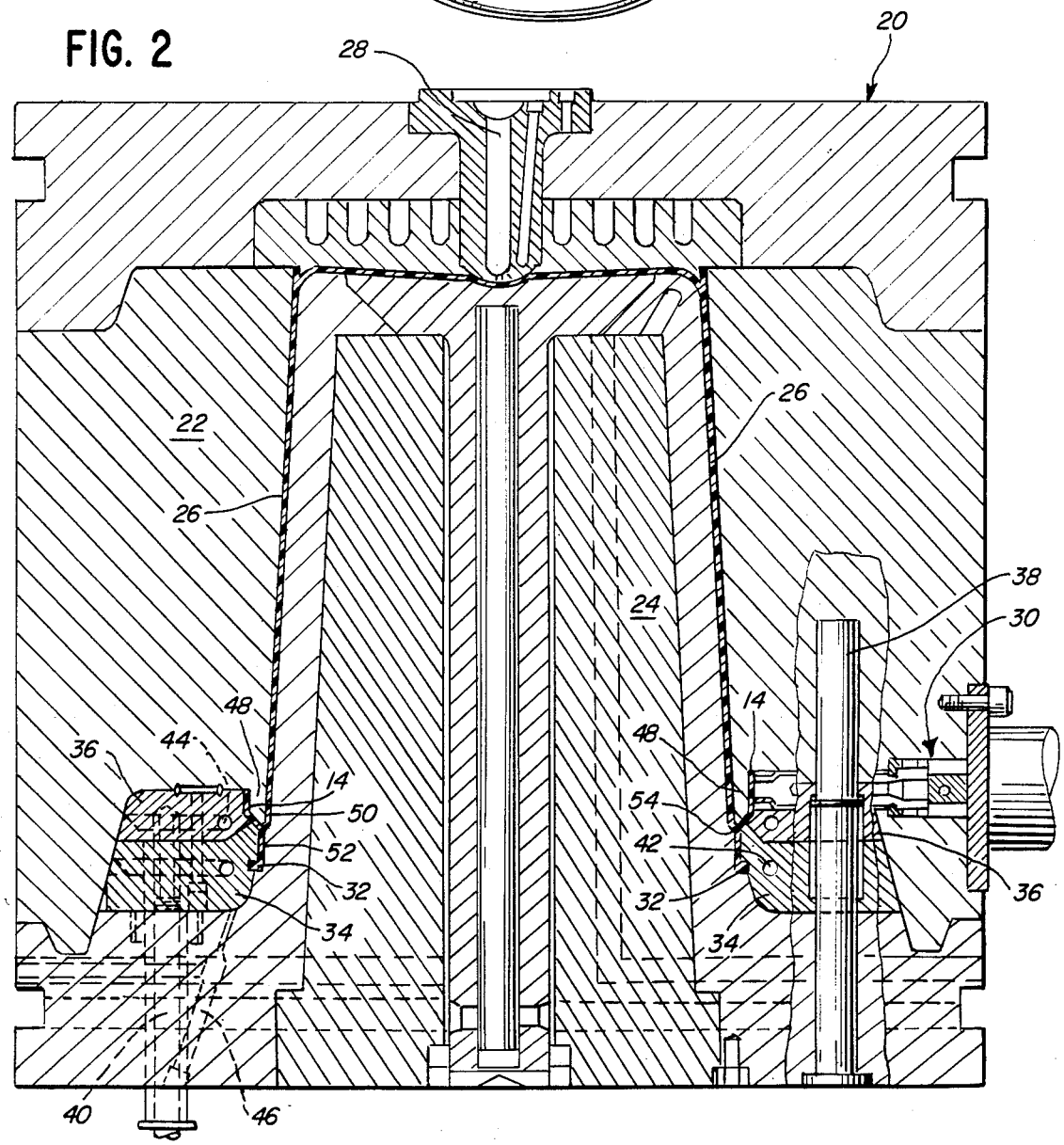
FIG. 2 is a longitudinal sectional view of a mold of this invention, the sectional planes of the right and left halves of FIG. 2 defining an angle of 90°.

Referring to FIG. 2, mold 20 defines outer mold half 22 and mold core 24 which define between them mold cavity 26, shown filled with molding compound which is in the process of forming bucket 10. Mold halves 22, 24 are movable by conventional means between a molding position as shown in FIG. 2 and an open position to permit removal of the molded buckets.

Sprue means 28 may be provided, being basically an aperture port communicating with mold cvaity 26 to provide molding compound.

Apparatus 30 may be provided for integral molding of bucket handle 18 and its pivotable connection with the bucket in accordance with known technology, which is available from the Plas-Tool Corporation of Niles, Ill.

Except as otherwise indicated herein, the details of structure and functioning of mold 20 may be conventional and in accordance with the prior art.

In accordance with this invention, mold cavity 26 defines annular chamber portion 32 for receiving molding compound to form, in this embodiment, outwardly projecting, relatively thick, annular rim 12 of each bucket 10 molded therein.

Stripper means are provided, in this embodiment comprising first stripper ring 34, which defines annular chamber 32, and second stripper ring 36, positioned on top of first stripper ring 34. It can be seen that second stripper ring is positioned to engage second flange 14 of buckets formed in mold cavity 26.

A plurality of pins 38 may serve to guide the movement of first and second stripper rings 34, 36 in the direction generally parallel to the movement of outer mold half 22 relative to mold core 24. A plurality of second pins 40 may be distributed around the stripper rings as well, driven by hydraulic or other means to move second stripper ring 36, to consequently move newly formed molded objects out of intimate contact with the old core by pushing on second flange 14.

Typically, a pair of diametrically opposed pins 38 may be present, plus a corresponding pair of diametrically opposed second pins 40, for efficient operation of stripper rings 34, 36.

Stripper rings 34 may carry water cooling lines 42, while stripper rings 36 carry water cooling lines 44. Outer mold half 22 and mold core 24 may also carry cooling water lines as desired. Compressed air line 46 is provided to assist in breakaway of first stripper ring 34 from core 24 as the mold opens.

Turning now to the operation of the molding apparatus, the molding position of the mold of this invention is illustrated in FIG. 2. After the molding compound in mold cavity 26 has cooled to a predetermined degree, mold 20 is opened. FIGS. 3 through 5 illustrate successive stages of the opening process, showing how bucket rim 12 can be removed from annular chamber portion 32 of mold cavity 26.

First, outer mold half 22 is moved to its open position, removing annular projection 48 out of its engagement with the interior face of second flange 14. However, it can be seen that the newly molded bucket in mold cavity 26 remains locked in position on mold core 24 because the newly formed rim 12 remains locked in annular chamber portion 32.

In the prior art, an expensive side action mechanism would be required at this point to move to the side, opening up annular chamber portion 32 for extrication of bucket rim 12. In accordance with this invention, as shown in FIG. 1, stripper ring 36 is driven by shafts 40 outwardly, taking bucket 10 with it out of engagement with mold core 24 by pressure against second flange 14. First stripper ring 34 passively slides along pin 38 as shown in FIG. 3, being carried by the engagement of annular chamber portion 32 with newly formed bucket rim 12.

It can be seen that mold core 24 defines a section 50 which is of less diameter than the mold core section 52 against which annular rim 12 is formed, being separated by annular step 54 as shown. Accordingly, as bucket 10 is moved outwardly by second stripper ring 36 and as first stripper ring 34 follows along, the thick, annular bucket rim 12 encounters space to shrink inwardly along section 50. Thick, annular rim 12 promptly does this in response to the cooling of the system, causing shrinkage as shown in FIG. 3.

Turning also to FIG. 4, snap ring 56, positioned on pin 38, restricts the range of outward motion of first stripper ring 34. As shown, the bore 58 of stripper ring 34 through which pin 38 passes defines an annular step 60 serving as a shoulder to engage snap ring 56 and limiting the motion of first stripper ring 34.

Second stripper ring 36, however, is not so limited, so, impelled by rods 40, it continues its advance, continuing to drive bucket 10 off of core 24, causing the thickened rim 12 of bucket 10 to snap free of annular chamber portion 32. The presence of annular rounded edge 62 defining a radius or chamfer at the upper edge of annular chamber 32 facilitates this.

At the same time, as shown in FIG. 4, a portion 63 of the mold core 24, which is of less diameter than portion 52, is parallel to an opposed portion 66 of stripper ring 34 to define an annular passage 64 of predetermined width.

Thus, thick, annular rim 12, still in slightly softened condition, may be shaped as necessary so that it will define a radial thickness that is equivalent to the thickness of annular passage 64. By this expedient, when bucket 10 is freed from mold core 24 as shown in FIG. 5, the precisely defined thickness of bucket rim 12 provides good control for its concentricity and its springback distance. It can be seen in FIG. 5 that bucket rim 12 has sprung outwardly a little bit from its position defined by annular channel 64. By proper control of the parameters of the molding operation such as temperature, molding time, speed of withdrawal of the bucket from the mold, and the like, the thicknened annular rims 12 of the buckets manufactured therein can be of very uniform final dimensions, so that they may be easily closed with a plastic closure of predetermined dimensions.

After removal of bucket 10, mold 20 may be closed again into its configuration as shown in FIG. 2 for another shot and the manufacture of another bucket.

Thus, the mold of this invention can operate without side action to produce a relatively thick, annular rim section 12 in the bucket of relatively uniform dimensions from bucket to bucket. Furthermore, no parting lines will be found on rim 12, which is advantageous for preventing leakage between the closure and the bucket rim.

The above has been offered for illustrative purposes only and is not intended to limit the scope of the invention of this application, which is as defined in the claims below.

I claim:

1. In a plastic injection mold having an outer mold half and a mold core defining between them a mold cavity, said mold half and said mold core being movable between a closed, molding position and an open position to permit removal of objects molded herein said injection mold having a mold opening and closing direction, and sprue means for allowing filling of the mold cavity with molding compound while in the closed molding position, the improvement comprising, in combination:

said plastic injection mold defining as part of the mold cavity an annular chamber position for receiving molding compound to form an outwardly projecting, relatively thick, annular section in a molded object;

stripper means for pushing newly formed molded objects out of initmate contact with the mold core a diameter of a portion of said mold core across which said annular section is pushed by said stripper means being less than the diameter of the mold core portion against which said annular section is formed, whereby a freshly molded annular section can shrink inwardly upon cooling and be drawn out of said annular chamber portion for removal from the mold, said stripper means being generally movable parallel to said mold opening and closing direction.

2. The mold of claim 1 in which said annular chamber portion is defined by said stripper means, said annular chamber portion being movable with newly formed molded objects as said newly formed molded objects are moved out of intimate contact with the mold core.

3. The mold of claim 1 in which said stripper means comprises a first stripper ring which defines said annular chamber portion, a second stripper ring defining one side of a second, outwardly projecting portion of the mold cavity, pin means for guiding the movement of said first and second stripper rings in a direction generally parallel to the movement of the mold core and outer mold half, and means for driving said second stripper ring to move said newly formed molded objects out of intimate contact with the mold core by pushing the outwardly projecting members formed in molded objects by the second outwardly projecting portion of the mold cavity.

4. The mold of claim 3 in which said first stripper ring is freely slidable on said pin means for a limited distance of less than the length of movement of said second stripper ring, to move with newly formed molded objects until their thick, annular section disengages from said annular chamber portion.

5. The mold of claim 4 in which, when said first stripper ring moves to the end of its limited distance, said second stripper ring continues to move, driving the thick annular section away from the annular chamber portion.

6. The mold of claim 1 in which said portion of said mold core of less diameter has at least a section thereof which is parallel to a portion of said stripper means, to define an annular passage of predetermined width that said thick, annular section must pass through, whereby the radial thickness of said thick annular section is precisely controlled, for precisely controlling concentricity, springback distance, and the like in the molded products.

7. The mold of claim 1 in which the mold cavity is shaped to form a bucket, said outwardly projecting, annular chamber portion being located at the portion of the mold cavity which defines the bucket rim.

8. In a plastic injection mold for making buckets having an outer mold half and a mold core defining between them a mold cavity, said mold half and mold core being movable between a closed molding position and an open position to permit removal of objects molded therein said injection mold having a mold opening and closing direction, and sprue means for filling the mold cavity with molding compound while in the closed position, the improvement comprising, in combination: said plastic injection mold defining as part of the mold cavity a bucket rim-forming annular chamber portion for receiving molding compound to form an outwardly projecting, relatively thick annular bucket rim; stripper means for pushing newly formed molded buckets out of intimate contact with the mold core, the diameter of a portion of said mold core across which said molded bucket rim is pushed by said stripper means being less than the diameter of the mold core portion against which said bucket rim is formed, said annular chamber portion being defined by said stripper means, said annular chamber portion being movable with newly formed objects as said newly formed objects are moved out of intimate contact with the mold core, whereby a freshly molded relatively thick annular bucket rim can shrink inwardly upon cooling and be drawn out of said annular chamber portion for removal from the mold said stripper means being generally movable parallel to said mold opening and closing direction.

9. The mold of claim 8 in which said stripper means comprises a first stripper ring which defines said annular chamber portion, a second stripper ring defining one side of a second, outwardly projecting portion of the mold cavity for forming an outer flange portion of said bucket which is spaced from the rim, pin means for guiding the movement of said first and second stripper rings in a direction generally parallel to movement of the mold core and mold cavity, and means for driving said second stripper ring to move newly formed molded objects out of intimate contact with the mold core by pushing the outer flange portion formed in molded objects by the second outwardly projecting portion of the mold cavity.

10. The mold of claim 9 in which said first stripper ring is freely slidable on said pin means for a limited distance of less than the length of movement of said stripper ring, to move with newly formed molded buckets until their thick annular rim disengages from said annular chamber portion when said first stripper ring moves to the end of its limited distance and said second stripper ring continues to move, driving the thick annular rim away from the annular chamber portion.

11. The mold of claim 9 in which said annular chamber portion defines an annular upper edge which is rounded to facilitate final removal of the bucket rim from the annular chamber portion by action of the second stripper ring as the first stripper ring comes to the end of this range of motion.

12. The mold of claim 9 in which said portion of the mold core of less diameter has at least a section thereof which is parallel to a portion of said stripper means, to define an annular passage of predetermined width that a thick annular rim must pass through, whereby the radial thickness of said thick annular rim is precisely controlled, for precisely controlling concentricity, spring-back distance, and the like in the molded products.

13. In a plastic injection mold having an outer mold half and a mold core defining between them a mold cavity, said mold half and mold core being movable between a molding position and an open position to permit removal of objects molded therein and sprue means filling the mold cavity with molding compound while in the closed position, the improvement comprising, in combination:
stripper means to facilitate moving of newly formed molded objects out of intimate contact with the mold core, said stripper means comprising a first stripper ring which defines an annular chamber portion for receiving molding compound to form an outwardly projecting relatively thick, annular section in the molded object, a second stripper ring defining one side of a second, outwardly projecting portion of the mold cavity, means for guiding the movement of said first and second stripper rings in a direction generally parallel to the movement of the mold core and mold cavity, and means for driving said second stripper ring to move newly formed molded objects out of intimate contact with the mold core by pushing the outwardly projecting members formed in molded objects by the second outwardly projecting portion of the mold cavity, said first stripper ring being freely slidable along its range of motion for a limited distance of less than the length of movement of said second stripper ring, to move with newly formed molded objects until their thick annular section disengages from said annular chamber portion.

14. The mold of claim 13 in which, when said first stripper ring moves to the end of said limited distance, said second stripper ring continues to move, driving the relatively thick annular section away from the annular chamber portion.

15. The mold of claim 14 in which a portion of said mold core has less diameter than the diameter of the mold core portion against which said annular section is formed, said mold core portion having a surface which is parallel to a portion of said stripper means, to define an annular passage of predetermined width that said thick, annular section must pass through, whereby the radial thickness of said thick annular section is precisely controlled, for precisely controlling concentricity, spring-back distance, and the like in the molded products.

16. The mold of claim 15 in which the mold cavity is shaped to form a bucket, said outwardly projecting, annular chamber portion being located a the portion of the mold cavity which defines the bucket rim.

17. In a plastic injection mold having an outer mold half and a mold core defining between them a mold cavity, said mold half and mold core being movable between a closed, molding position and an open position to permit removal of objects molded therein, said injection mold having a mold opening and closing direction and sprue means for allowing filling of the mold cavity with molding compound while in the closed molding position, the improvement comprising, in combination: said mold defining as part of the mold cavity an annular chamber portion for receiving molding compound to form an outwardly projecting, relatively thick annular section in the molded object; stripper means for pushing newly formed molded objects out of intimate contact with the mold core, a portion of the mold core across which said annular section is pushed by the stripper means being of less diameter than the mold core portion against which said annular section is formed and being parallel to a portion of said stripper means to define an annular passage of predetermined width that said thick annular section must pass through, whereby the radial thickness of said thick annular section is precisely controlled for precisely controlling concentricity and spring-back distance in the molded objects, said stripper means being generally movable parallel to said mold opening and closing direction.

18. The mold of claim 17 in which the mold cavity is shaped to form a bucket, said outwardly projecting annular chamber portion being located at the portion of the mold cavity which defines the bucket rim.

19. The mold of claim 18 in which said stripper means can move cooling, freshly molded objects across said section of the mold core of less diameter whereby a, freshly molded annular section can shrink inwardly upon cooling and be drawn out of said annular chamber portion for removal from the mold.

20. The mold of claim 19 in which the parallel portion of the mold core of less diameter is separated from the larger-diameter portion of the mold core adjacent the annular chamber portion by an annular step formed in the mold core.

* * * * *